United States Patent [19]

Kaufman

[11] Patent Number: 5,711,210
[45] Date of Patent: Jan. 27, 1998

[54] COLLAPSIBLE AND PORTABLE COMBINATION CHAFING DISH AND BARBECUE

[76] Inventor: Kenneth L. Kaufman, 6903 Amestoy Ave., Van Nuys, Calif. 91406

[21] Appl. No.: 651,045

[22] Filed: May 17, 1996

Related U.S. Application Data

[63] Continuation-in-part of Ser. No. 333,854, Nov. 3, 1994, Pat. No. 5,517,903.

[51] Int. Cl.$^6$ .................. A47J 27/00; F24C 1/16
[52] U.S. Cl. .................. 99/340; 99/449; 126/9 R
[58] Field of Search .................. 99/340, 449; 126/9 R, 126/9 A, 9 B

[56] References Cited

U.S. PATENT DOCUMENTS

| | | | |
|---|---|---|---|
| 156,470 | 11/1874 | Warner | 249/172 |
| 1,261,566 | 4/1918 | Lewitzky | 249/172 |
| 1,714,379 | 5/1929 | Kratz . | |
| 3,828,966 | 8/1974 | Martin | 220/7 |
| 3,841,298 | 10/1974 | Sellors | 126/9 A |
| 3,884,214 | 5/1975 | Duncan | 126/9 R X |
| 4,106,486 | 8/1978 | Lee | 126/369 |
| 4,126,116 | 11/1978 | McCallum | 126/9 R |
| 4,164,930 | 8/1979 | Johnston | 126/38 |
| 4,284,058 | 8/1981 | Lütz | 126/9 R |
| 4,363,313 | 12/1982 | Smith | 126/9 R |
| 4,368,727 | 1/1983 | Higgins et al. | 126/25 C |
| 4,455,992 | 6/1984 | Hsiao | 126/9 R |
| 4,548,193 | 10/1985 | Marogil | 126/9 R X |
| 4,569,327 | 2/1986 | Velten | 126/9 R X |
| 4,630,593 | 12/1986 | Gremillion | 126/25 R |
| 4,646,711 | 3/1987 | Oliphant | 126/9 R |
| 4,681,083 | 7/1987 | Shu | 126/9 R |
| 4,709,827 | 12/1987 | Jaillet et al. | 220/4 A |
| 4,714,013 | 12/1987 | Telfer | 99/449 |
| 4,779,605 | 10/1988 | Smith et al. | 126/33 |
| 4,920,873 | 5/1990 | Stevens | 99/339 |
| 4,922,887 | 5/1990 | Foxford | 126/41 R |
| 4,924,844 | 5/1990 | Bransburg | 126/9 R |
| 4,958,618 | 9/1990 | Davidson | 126/9 B |
| 4,962,696 | 10/1990 | Gillis | 99/340 |
| 5,045,672 | 9/1991 | Scott | 219/439 |
| 5,119,799 | 6/1992 | Cowan | 126/9 R |
| 5,119,800 | 6/1992 | Roberts et al. | 126/377 |
| 5,243,961 | 9/1993 | Harris | 126/9 R |
| 5,287,800 | 2/1994 | Orednick | 99/449 |
| 5,303,691 | 4/1994 | Armistead | 126/9 R |

*Primary Examiner*—Reginald L. Alexander
*Attorney, Agent, or Firm*—Daniel L. Dawes

[57] ABSTRACT

A rugged, flatly folding, portable chafing dish assembly is comprised of a cover, food pan, water pan, collapsible stand and heat source. The collapsible stand is rectangular and is comprised of four rigid plates forming the sides of the rectangular stand which are rotatably coupled together by means of a flatly folding piano hinge. The hinge is integrally formed with the sides and can be disassembled for cleaning. The two lateral sides of the stand are identical and interchangeable, as are the two end sides. The rectangular stand is provided with apertures through the lateral and end sides, both for air access to create a heat draft for the burner source when placed within the stand, as well as access to the burners when the chafing dish assembly is assembled. A rigid rectangular tray extends the length of the stand and connects to the end sides along an access aperture edge thereby rendering the otherwise collapsible rectangular stand rigid. Additional rigidity of the chafing dish assembly is realized when the water pan and food pan are disposed in the stand in as nested fashion.

23 Claims, 11 Drawing Sheets

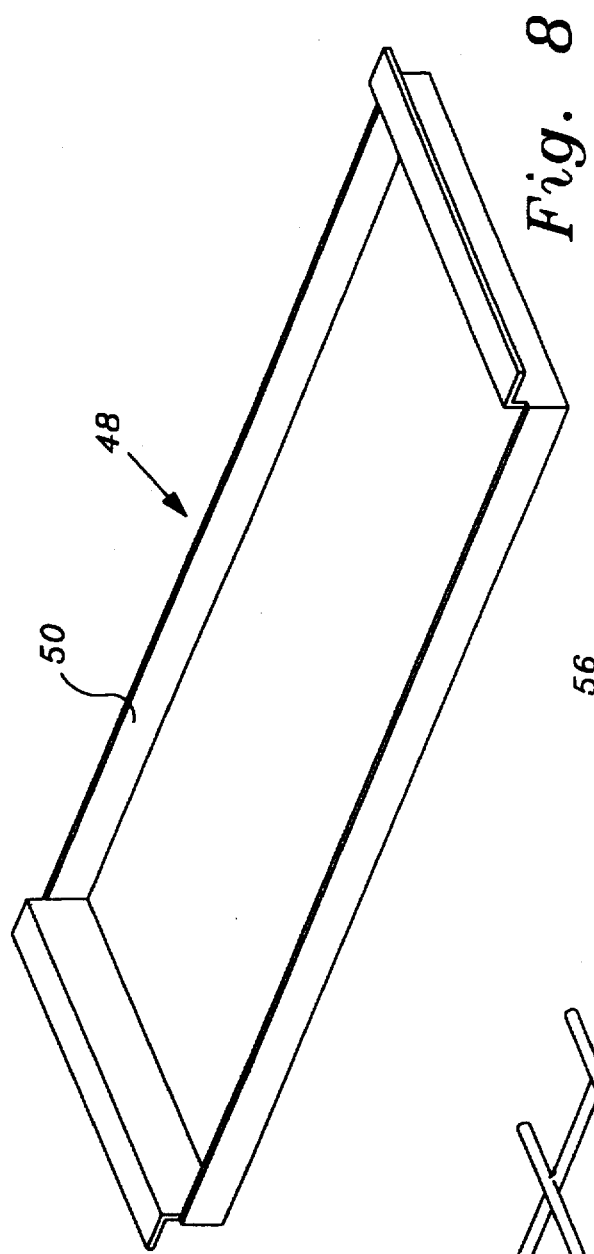
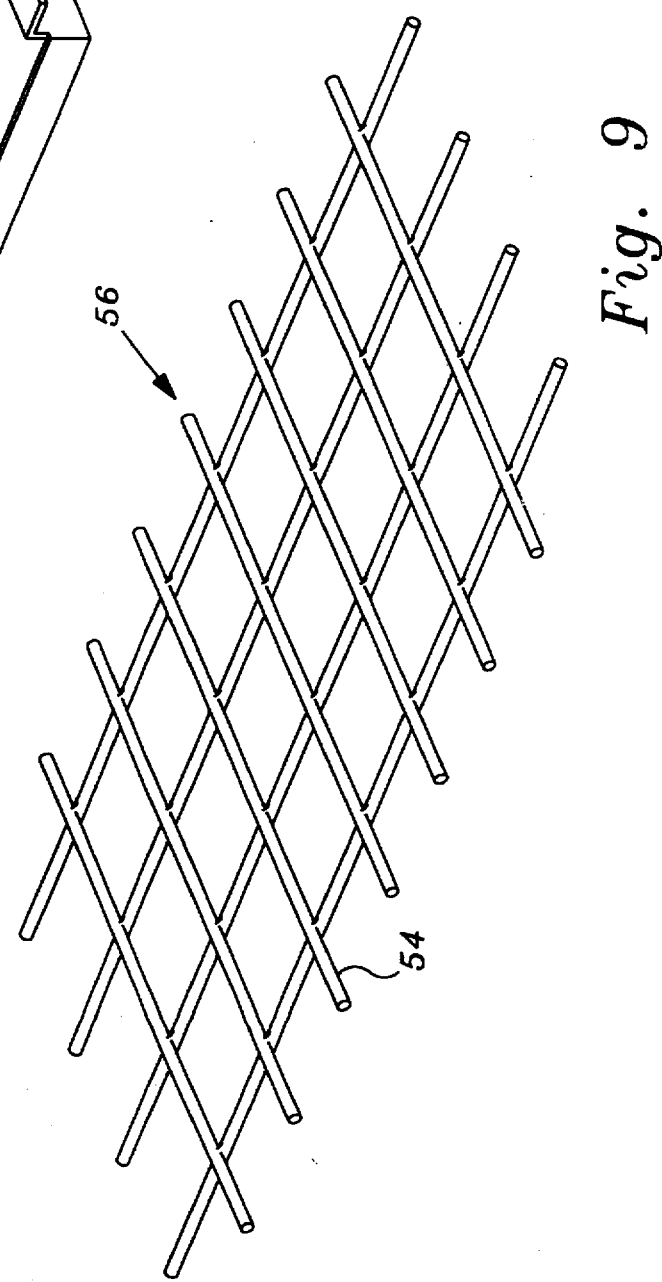

COLLAPSIBLE AND PORTABLE COMBINATION CHAFING DISH AND BARBECUE

RELATED APPLICATIONS

The present application is a continuation-in-part application of U.S. patent application Ser. No. 08/333,854, filed Nov. 3, 1994, entitled "An Improved Collapsible and portable Chafing Dish" and issued as U.S. Pat. No. 5,517,903.

BACKGROUND OF THE INVENTION

1. Field of the Invention

The invention relates to the field of catering and cooking apparatus, and in particular, to a portable, collapsible combination barbecue and chafing dish.

2. Description of the Prior Art

Food catering services typically serve the prepared foods from a buffet line from a plurality of chafing dishes or trays which are typically comprised of a stand for holding a double-boiler pan and for positioning a heat source under the double-boiler pan. The double-boiler pan is partially filled with water and a serving dish is nested within it. The serving may also be provided with a cover. In this manner, heat from the heat source, typically a candle or a fuel can, such as manufactured under the trademark, STERNO, is used to transfer heat to the water in the double-boiler pan from whence it is transferred through vapor convection to the serving pan and the food therein.

The chafing dishes are expensive to manufacture, and even when robustly made, generally have a limited life due to repeated or rough handling. This is particularly the case in the application of mobile catering where the chafing dishes must be transferred from a storage space in the catering kitchen, to the catering truck, transported to the catering site and then set up on the buffet table at the catering site. After the catering service is rendered, the process is reversed. Repeated rough handling in this type of environment eventually results in damage to the chafing dish.

In the case where the chafing dish has been made portable by having collapsible design so that storage of multiple chafing dishes within the limited space of the catering track is facilitated, the design which permits portability generally compromises its structural rigidity and robustness. Therefore, portable and collapsible chafing dishes have even a more limited life time in catering applications than the more bulky and noncollapsible rigid chafing dishes.

Several types of collapsible chafing dishes or cooking implements have been devised. Lee, "Cooking Utensil," U.S. Pat. No. 4,106,486 (1978) shows a cooking utensil comprising a bottom pan 10, and inner pan 30 which fits into bottom pan 10. A space is provided between the walls of inner pan 30 and the opposing walls of bottom pan 10. A cover 12 for bottom pan 10 and inner pan 30 is also provided. Inner pan 30 includes a perforated bottom 31, perforated opposing side walls 32 and 33 and perforated opposing end walls 35 and 36. Handles 39 and 40 are attached to side walls 35 and 36 respectively. End walls 35 and 36 are hinged at the lower corners to the side walls by pivot pins 38. The open configuration of pan 30 is illustrated in FIG. 4. Lee shows a nested set of pans with covers that included at least one foldable side on one of the pans.

Martin, "Collapsible Baking Pan," U.S. Pat. No. 3,828, 966 (1974) shows a baking pan 10 in FIG. 1 which is comprised of base 11 and four sides 12–15 each of which are hinged by hinges 16 to base 11. The hinges include fold out support 17 shown in side view in FIG. 4 and in prospective view in FIG. 3. Each support 17 includes a laterally extending number 18 having a hinged upstanding member 19 which hold sides 12–15 in place when the sides are in a closed position. The baking pan is formed from light weight material such as aluminum. While relevant for showing a hinged pan, Martin does not suggest a nested pan within a foldable hinged chafing body.

Kratz, "Baking Pan," U.S. Pat. No. 1,714,379, (1929), shows a baking pan having a bottom 1 each side of which is provided with a cylindrical roll 2, side walls 4 and end walls 5. Each side has a lower end provided with a U-shaped extension 6 which is adapted to be received within roll 2 so that each side wall 4 and end wall 5 is hinged to bottom 1. The ends of side walls 4 and rolled about a reinforcing wire 8, seen in FIG. 2, while ends of end walls 5 are shaped to provide a cylindrical rolled extension 9 which receive the rolled ends of side walls 4.

While Kratz is relevant for showing a collapsible rectangular unit, Kratz fails to suggest a combination which a chafing pan and moreover would have to be materially modified to eliminate the bottom side 1.

Lewitzky, "Baking Pan," U.S. Pat. No. 1,261,566 (1918) shows a baking pan having a bottom 6 with an up-standing side and end flanges 7 and 8 respectively, side walls 10 and end walls 13. Each wall has a lower end which is hinged to the respective side. In addition, and hinged flange and latch 20 are pivotally connected to a flange 15, seen in FIG. 1 of each end wall 13. Latch 20 is received by a loop 23 in each side wall 12. Lewitzky is relevant for showing the construction of a collapsible pan although not in an overall combination in chafing pan.

What is needed, therefore, is a chafing dish which can be compactly stored and transported, but which is of such a design that it is neither bulky or prone to damage by ordinary rough handling. A portable collapsible chafing dish which folds flatly or compactly to facilitate storage in limited space of multiple units of the chafing dish is needed. As an unexpected bonus, the elements of the chafing dish can be combined with a few simple auxiliary elements to also provide a collapsible barbecue or grill.

BRIEF SUMMARY OF THE INVENTION

The invention is a chafing dish assembly comprising a lid, a food pan coverable by the lid, a water pan into which the food pan nests, and a collapsible stand into which the water pan nests. The collapsible stand is comprised of four sides forming a rectangular structure. Each adjacent side is coupled together by element of a flatly folding hinge. A structural element is provided for temporarily rendering the collapsible stand rigid. In the preferred embodiment, this element is a tray for holding and positioning the burners. As a result, a rugged easily stored collapsible chafing dish assembly is provided.

The hinge between each of the sides of the stand is integrally formed with each side. The stand has two opposing lateral sides and two opposing end sides. The lateral sides are provided with a plurality of apertures defined therethrough to promote air draft.

The element for rendering the stand rigid comprises a rectangular tray temporarily attachable along ends of the tray with opposing sides of the chafing assembly. Each of the end sides are provided with a rectangular aperture. The rectangular tray has an end flange at each end of the rectangular tray which end flange is arranged and configured to slip-fit over an edge of the rectangular aperture defined in each the end side. A heat source is disposable within the stand to provide heat to the water pan. The tray provides support for the heat source to position the heat source appropriately with respect to the water pan and to maintain the heat source in a position spaced above bottom of the stand. Apertures are defined in the end sides provide physical access to the heat source within the stand.

The lateral and end sides are interchangeable and identical. This facilitates easy repair and replacement. The sides comprise a wind-sheltered enclosure into which the heat source is placed. In the preferred embodiment the sides fold flatly to a thickness of no more than one-half inch.

The improvement further comprises an element for carrying a fuel adapted for barbecuing and at least one grill rack. The element for carrying is supported within the stand below an upper edge thereof. The grill rack is supported within the stand above the fuel so that the chafing dish assembly is converted into a portable collapsible barbecue. At least one skillet plate is also provided. The element for carrying is supported within the stand below an upper edge thereof. The skillet plate is supported within the stand above the fuel so that the chafing dish assembly is converted into a portable collapsible cookstand. In particular the element for carrying is supported by the element for temporarily rendering the stand rigid. Alternatively, the element for carrying replaces and performs the function of the element for temporarily rendering the stand rigid.

The invention may be better visualized by now turning to the following drawings wherein like elements are referenced by like numerals.

BRIEF DESCRIPTION OF THE DRAWINGS

FIG. 8 is a perspective view of a carrying tray for charcoal or other fuel suitable for barbecuing which is used to convert the stand of the chafing dish assembly into a portable, collapsible barbecue or may be used in the second embodiment where the assembly is intended for use only as a barbecue.

FIG. 9 is a perspective view of a grill rack used with the tray of FIG. 8 to convert the stand of the chafing dish assembly into a portable, collapsible barbecue or may be used in the second embodiment where the assembly is intended for use only as a barbecue.

These and additional embodiments of the invention may now be better understood by turning to the following detailed description wherein an illustrated embodiment is described.

DETAILED DESCRIPTION OF THE PREFERRED EMBODIMENT

A rugged, flatly folding, portable chafing dish assembly is comprised of a cover, food pan, water pan, collapsible stand and heat source. The collapsible stand is rectangular and is comprised of four rigid plates forming the sides of the rectangular stand which are rotatably coupled together by means of a flatly folding piano hinge. The hinge is integrally formed with the sides and can be disassembled for cleaning. The two lateral sides of the stand are identical and interchangeable, as are the two end sides. The rectangular stand is provided with apertures through the lateral and end sides, both for air access to create a heat draft for the burner source when placed within the stand, as well as access to the burners when the chafing dish assembly is assembled. A rigid rectangular tray extends the length of the stand and connects to the end sides along an access aperture edge thereby rendering the otherwise collapsible rectangular stand rigid. Additional rigidity of the chafing dish assembly is realized when the water pan and food pan are disposed in the stand in as nested fashion.

The collapsible stand is converted to a barbecue by the addition of a charcoal tray placed on the support tray, one or more grill racks, and/or a skillet plate disposed on or in the stand.

Figure 1A:
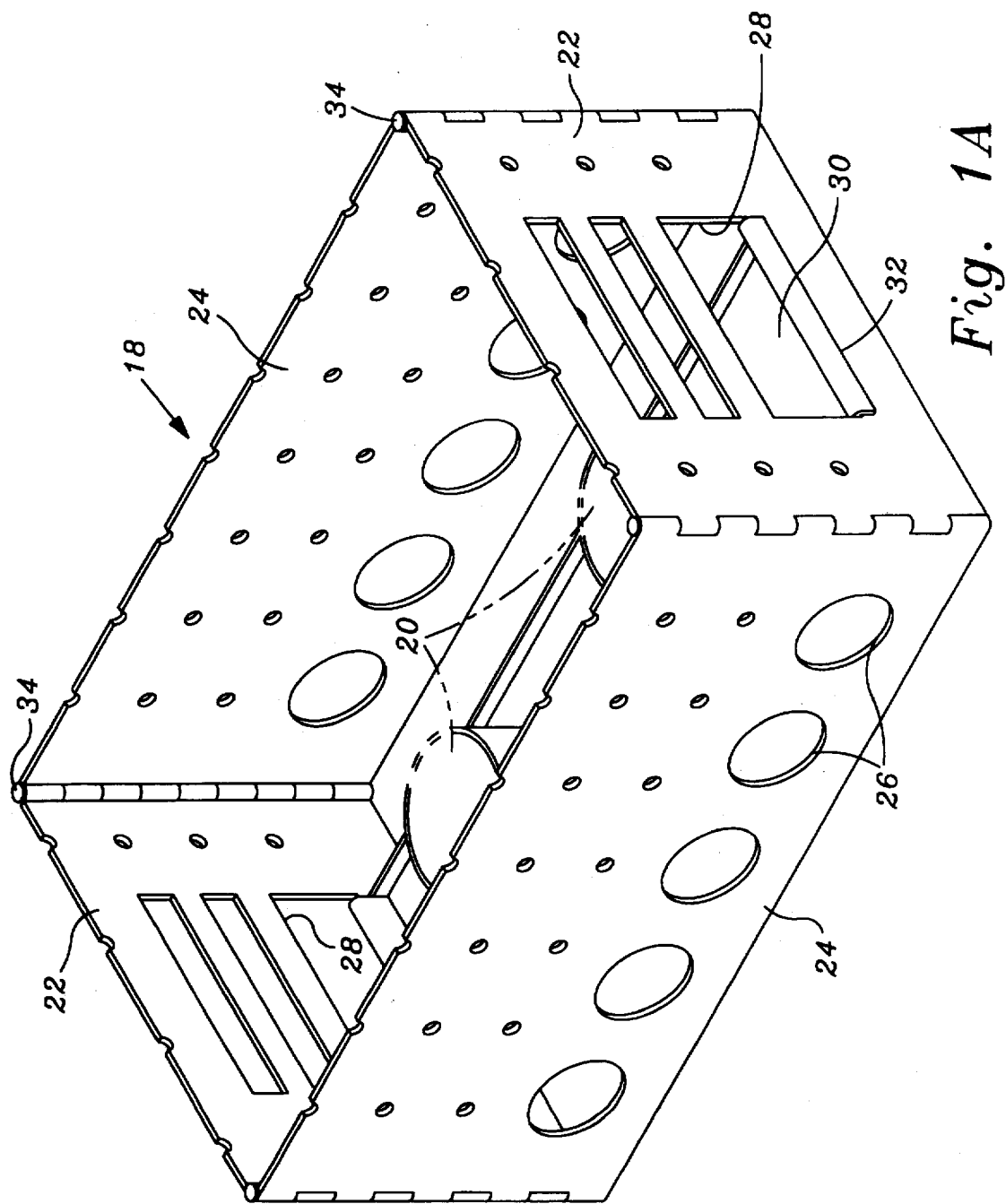
FIG. 1A is a perspective view the collapsible stand of the invention usable either as a chafing dish assembly or barbecue.
Figure 1B:
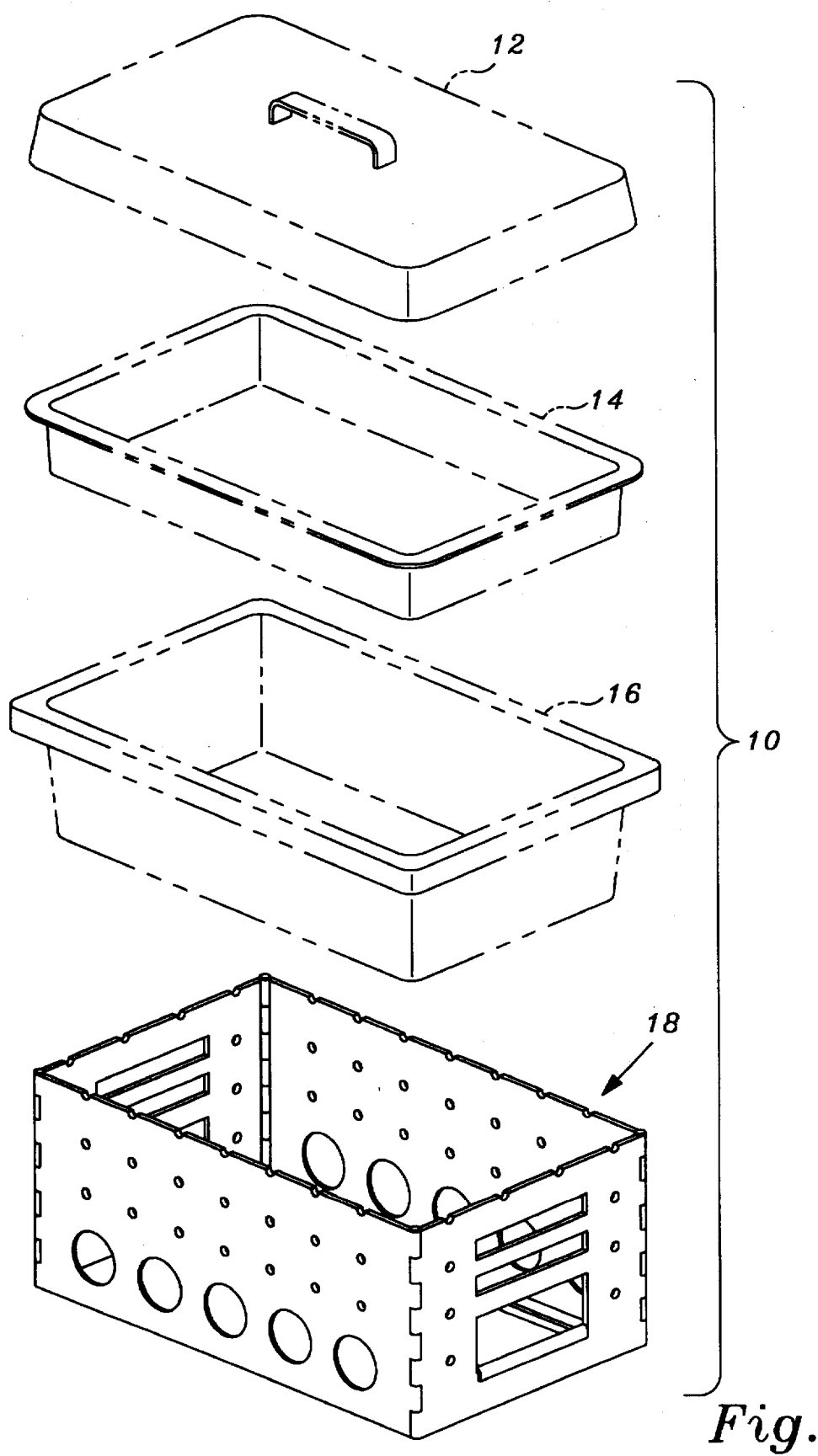
FIG. 1B is an exploded perspective view of a chafing dish/barbecue assembly using the collapsible stand of the invention showing the remaining elements of the assembly in dotted outline when used as a chafing dish.

FIG. 1B is an exploded perspective view showing the chafing dish assembly, generally denoted by reference numeral 10. Chafing dish assembly 10 is comprised of a cover 12, food pan 14, water pan 16, collapsible stand 18 and heat source 20. Each of the elements comprising chafing dish assembly 10 is preferably made of metal. Commonly used materials include stainless steel and aluminum. In some applications, plated metals, such as silver, brass, gold or cooper, may be employed for decorative effect.

As shown in FIG. 1B, water pan 16 slips on top of and is held by collapsible stand 18 in a manner similar to conventional chafing dish assemblies. When the curved lips of water pan 16 are placed on and extend over the upper edges of collapsible stand 18 some additional rigidity is provided to collapsible stand 18 in its expanded configuration by pan 16. The main structural reinforcement of stand 18 is provided, however, by means of tray 30 described below.

Preferably, stand 18 is rigidly maintained in its expanded configuration before water pan 16 is placed upon it.

Heat source 20 is placed within collapsible stand 18 in the manner described in greater detail below to provide heat to water which is placed in water pan 16 which then acts as a double-boiler. Food pan 14 then nests into water pan 16 and is supported by the top edges of water pan 16 in a conventional manner. The depth of food pan 14 is less than the depth of water pan 16, thereby providing a space for the heated water reservoir and steam between food pan 14 and water pan 16. Cover 12 is placed on and completely covers food pan 14 to further retain heat and water within the food as well as to keep foreign matter out. To the extent thus far described, the elements of chafing assembly 10 are conventional with the exception of collapsible stand 18.

Collapsible stand 18 is unique to the invention, and as shown in FIG. 1A, is comprised of four hinged rigid sides, namely ends 22 and lateral sides 24, which collectively form a rectangular stand into which water pan 16 nests. Lateral sides 24 are provided with a plurality of openings 26, which are shown in the embodiment of FIG. 1A as circular apertures. It is to be understood that the number and shape of openings 26 may be varied according to decorative and arbitrary design choices. The basic function of openings 26 are not only to lighten collapsible stand 18, but also to provide adequate air draft for heat sources 20.

Ends 22 in the illustrated embodiment are each provided with large rectangular apertures 28, which also provide air to heat source 20, provide physical access to the interior collapsible stand 18 and hence to heat source 20, as well as serve to lighten collapsible stand 18.

Figure 7:
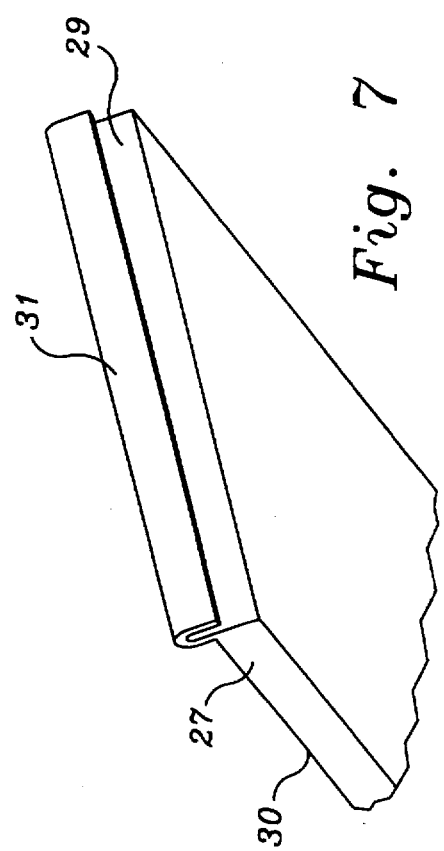
FIG. 7 is an end perspective view in enlarged scale of the burner tray used in the collapsible stand of the first embodiment of the invention.

A burner tray 30 extending the length of collapsible stand 18 is disposed into collapsible stand 18 and is provided at each end with a capturing lip 32 which rests on and extends over the lower edge of end aperture 28 as best depicted in FIG. 7. Burner tray 30 is a rigid rectangular tray in which one or more heat sources 20 may be placed. In addition to providing support and positioning for the burners, tray 30 is the structural element of collapsible stand 18 which renders it rigid. With tray 30 removed, collapsible stand 18 is free to fold completely flatly as permitted by hinges 34 at each of the wall connections. Because of the freely rotatable hinge connection, collapsible stand 18 thus folds out loosely and does not assume a rigid rectangular shape until tray 30 is placed into it and connected by overhanging flanges 32 to the lower edges of apertures 28. Once tray 30 is thus positioned, collapsible stand 18 assumes a surprisingly rigid configuration. Thereafter burner 20 is disposed on tray 30 and then water pan 16 on stand 18.

It is expressly contemplated that end apertures 28 may be modified in both size and shape according to the application at hand. For example, apertures 28 may be replaced by horizontal slots only large enough to accommodate end flanges 32 of tray 30 to fix collapsible stand 18 in rigid form, and also to provide a bearing surface for heat sources 20 above the surface on which collapsible stand 18 may be placed.

In the illustrated embodiment, heat sources 20 are STERNO-type fuel cans, namely, openable tins or cans filled with a burnable jelly, each included in a cup holder with adjustable lids, as is conventional. Any type of heat source may be employed in addition to a STERNO can without departing from the spirit and the scope of the invention.

Tray 30 may also be modified to accommodate heat source 20, for example, by providing a series of conforming indentations in tray 30 into which STERNO cup holders of heat source 20 may be placed and retained.

Figure 1C:
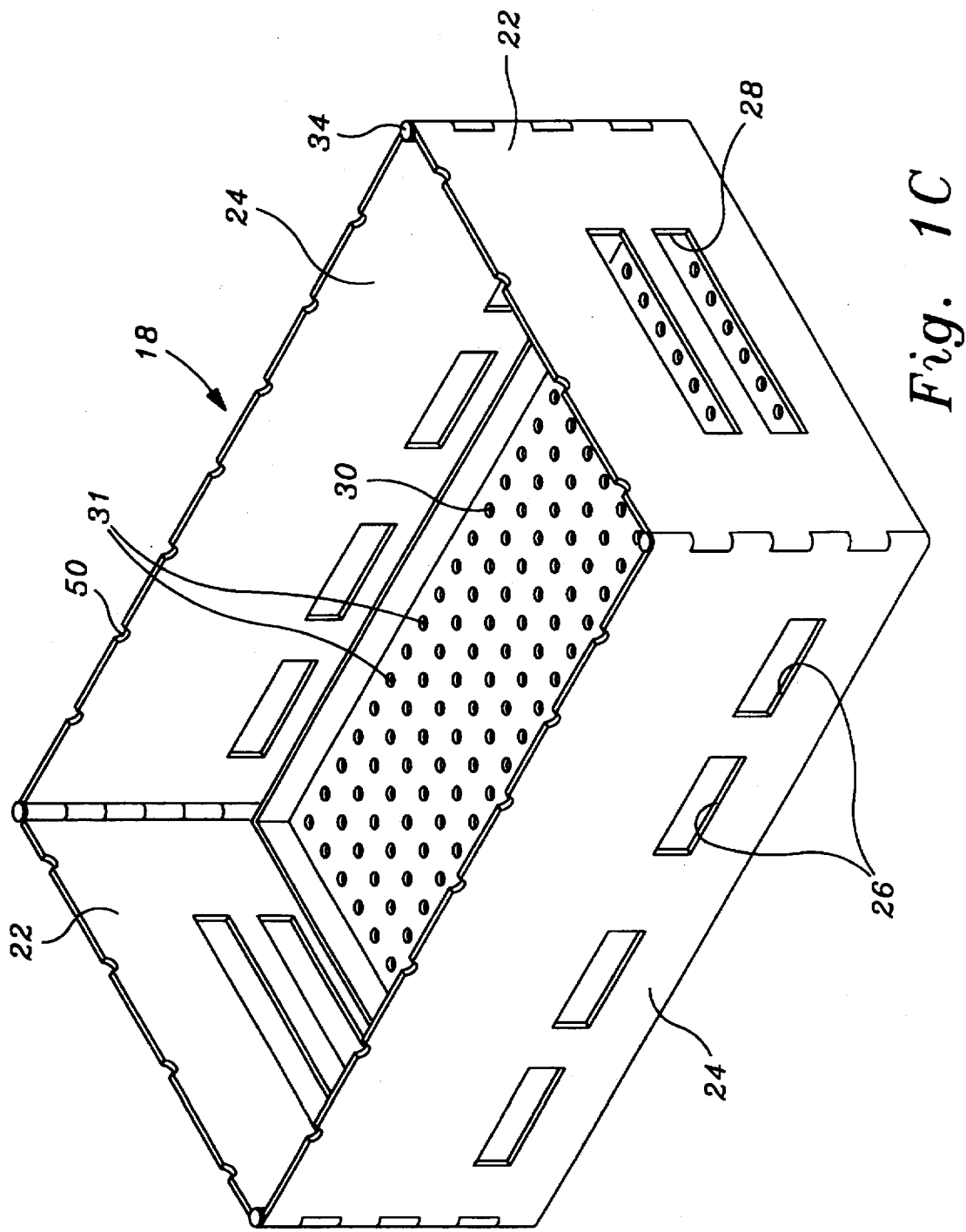
FIG. 1C is a perspective view of another embodiment the invention showing the collapsible stand when used only as a barbecue assembly with the grill and skillet removed.

FIG. 1C shows a second embodiment of the invention in which the stand 18 to be used as a barbecue only is designed with essentially the same conceptional elements of stand 18 when used as a chafing dish/barbecue combination. Openings 26 are differently shaped and placed, and tray 30 is differently configured to carry charcoal or other wood fuel, or to accommodate plumbing for gas, propane or other petroleum burners (not shown). In the embodiment of FIG. 1C tray 30 is provided with a plurality of holes 31 defined through tray 30 to increase air access to the burning fuel which is placed on top of tray 30, and is further widened to cover substantially the entire area within stand 18. End apertures 28 may also be changed in shape and position as compared to the embodiments of FIGS. 1A and B, to allow for placement of tray 30 toward or away from on overlying grill or skillet as shown in FIGS. 8 and 9. Furthermore, access to fuel cans is not necessarily required through ends 22 thereby avoiding the need for a larger hand access opening.

Figure 2:
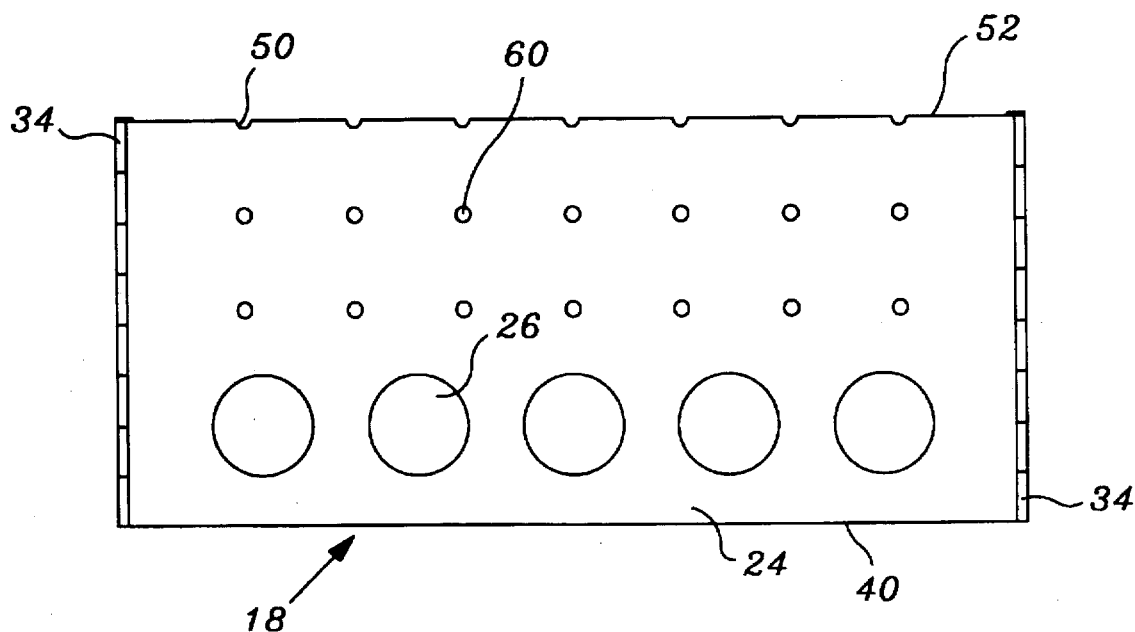
FIG. 2 is a side plan view of the collapsible stand used in FIGS. 1A and B.
Figure 3A:
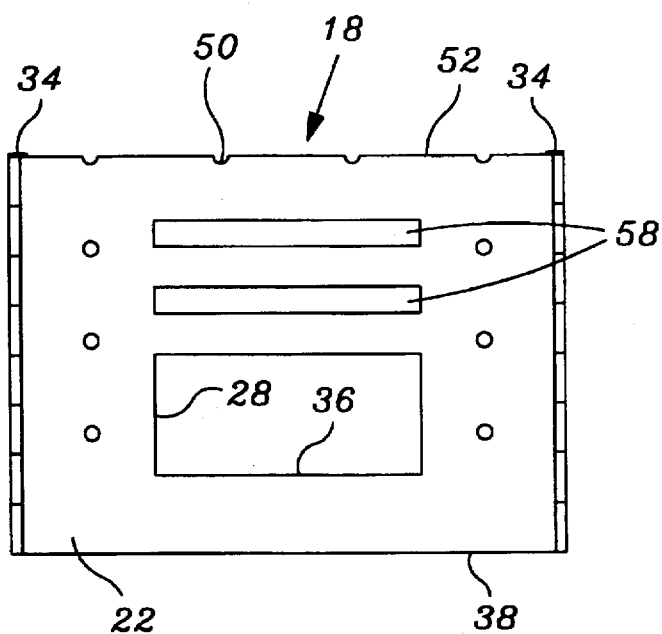
FIG. 3A is a plan elevational end view of the collapsible stand used in FIGS. 1A and B, and 2.

FIG. 2 illustrates a side plan view of collapsible stand 18, while FIG. 3A is a plan end view of collapsible stand 18. In the illustrated embodiment, lateral side 24 is comprised of ⅛-inch aluminum plate, and has a length of approximately 20.5 inches. The height of lateral side 24 and ends 22 is approximately 9 inches. Apertures 26 are approximately 2 inches in diameter and provided on 3-inch centers. In the view of FIG. 2, the centerline of aperture 26 is approximate 3 inches from the bottom of lateral side 24. End aperture 28 as shown in FIG. 3A, is approximately 6 inches in length and 4¼ inches in height. Bottom edge 36 is approximately 1¾ inches from bottom edge 38 of end 22.

Figure 3B:
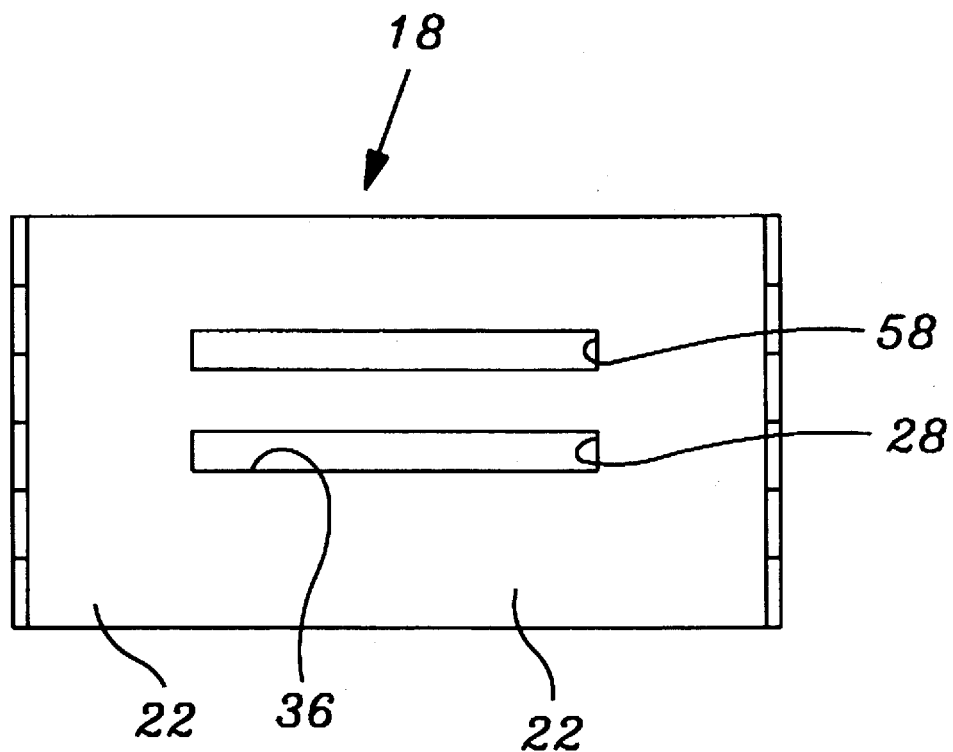
FIG. 3B is a plan elevational end view of the collapsible stand in the second embodiment of the invention when used only as a barbecue.

FIG. 3B is a plan elevational end view of the collapsible stand in the second embodiment of the invention when used only as a barbecue corresponding to the embodiment of FIG. 1C.

Figure 5:
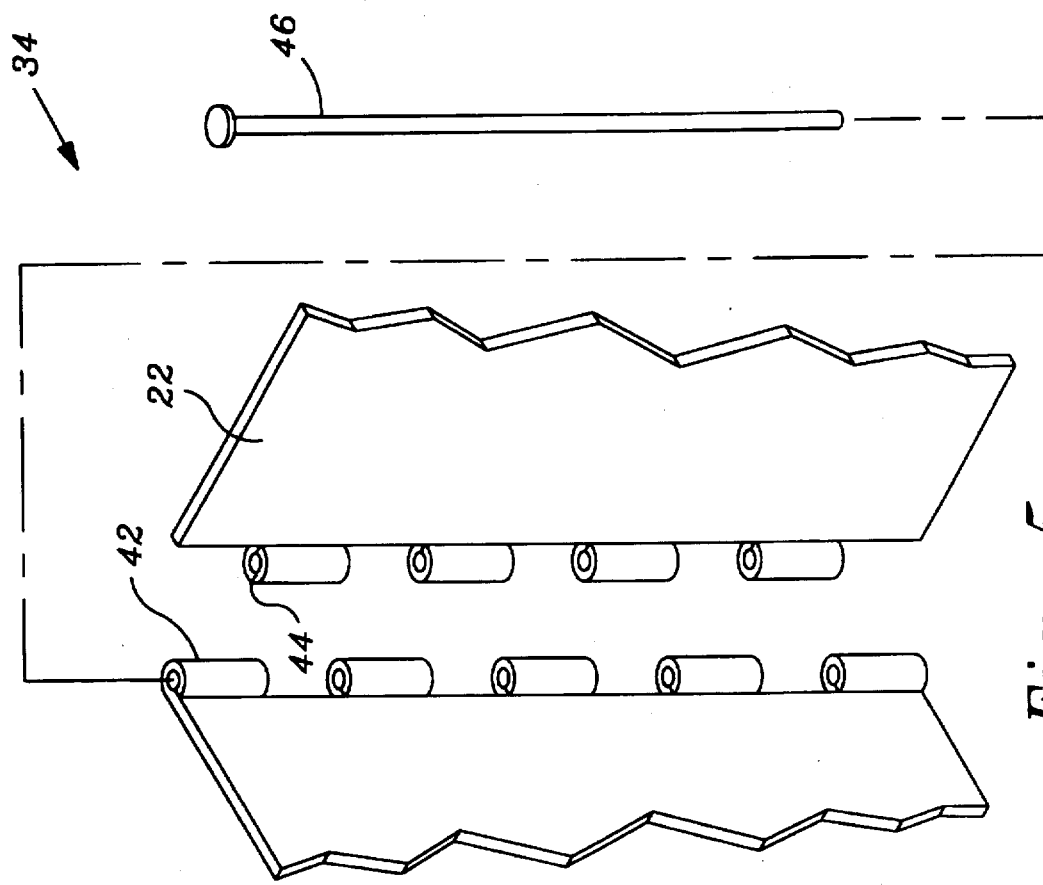
FIG. 5 is a perspective view of one hinged corner of the collapsible stand used in FIGS. 1A-3B shown in enlarged scale in an unassembled configuration.
Figure 4:
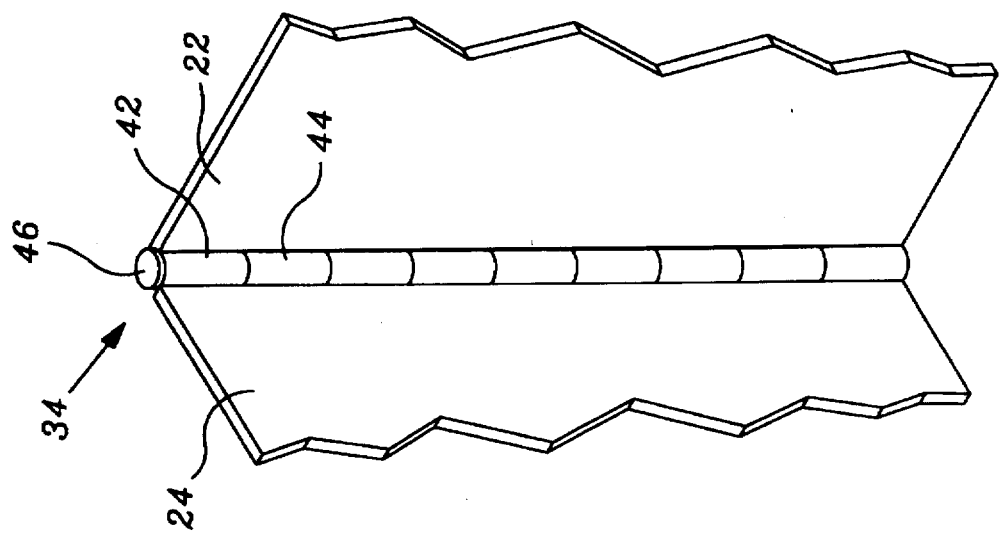
FIG. 4 is a perspective view of one hinged corner of the collapsible stand used in FIGS. 1A-3B shown in enlarged scale in an assembled configuration.

As best shown in the perspective views of FIGS. 4 and 5, the hinge, generally denoted by reference numeral 34, is comprised of a first plurality of sleeves 42 which are integrally formed from lateral side 24. A second plurality of sleeves 44 are similarly integrally formed in end 22. Sleeves 42 and 44 are configured to interleave with each other to form a conventional columnar sleeve structure, such as depicted in FIG. 4, through which hinge pin 46 is disposed as shown in FIG. 4.

Thus, it may now be appreciated that collapsible stand 18 is fabricated from only two separate pieces, each lateral side 24 being identical and interchangeable, and each end 22 being identical and interchangeable. Therefore, only two parts need be maintained in inventory to provide for a full repair or replacement kit for stand 18.

Furthermore, with tray 30 removed, collapsible stand 18 folds flatly to a thickness of no more than ½ inch. Chafing dish assembly 10, and in particular collapsible stand 18, can be completely disassembled by removing hinge pins 46 to permit thorough cleaning. Further, unlike open flame supports for conventional chafing dishes, collapsible stand 18 provides a substantial enclosure for heat sources 20 so that chafing dish assembly 10 can be used in outdoor locations where natural winds and drafts might otherwise substantially interfere with the heating capability of the STERNO pots, or even extinguish them.

Figure 6A:
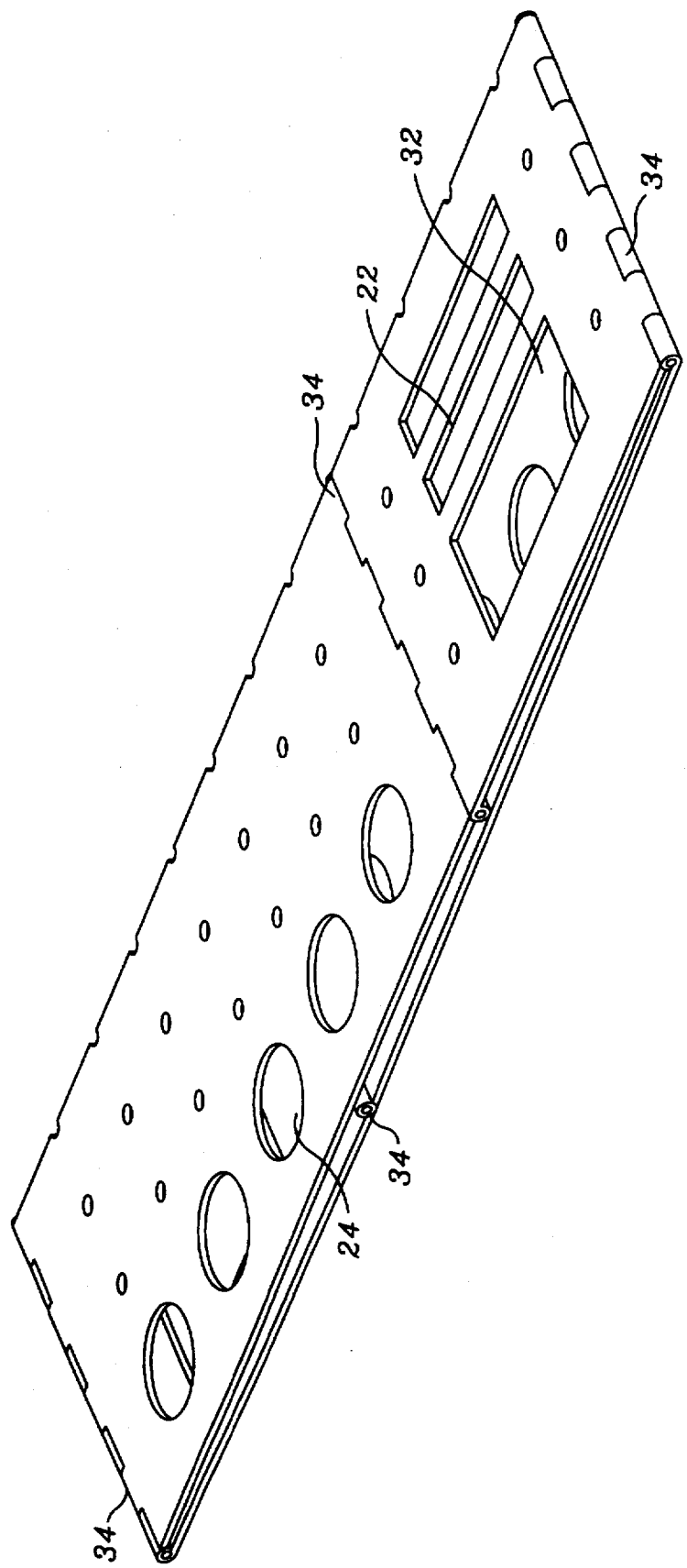
FIG. 6A is a perspective view of the first embodiment the collapsible stand of FIGS. 1A-5 shown in a collapsed or flatly folded configuration.
Figure 6B:
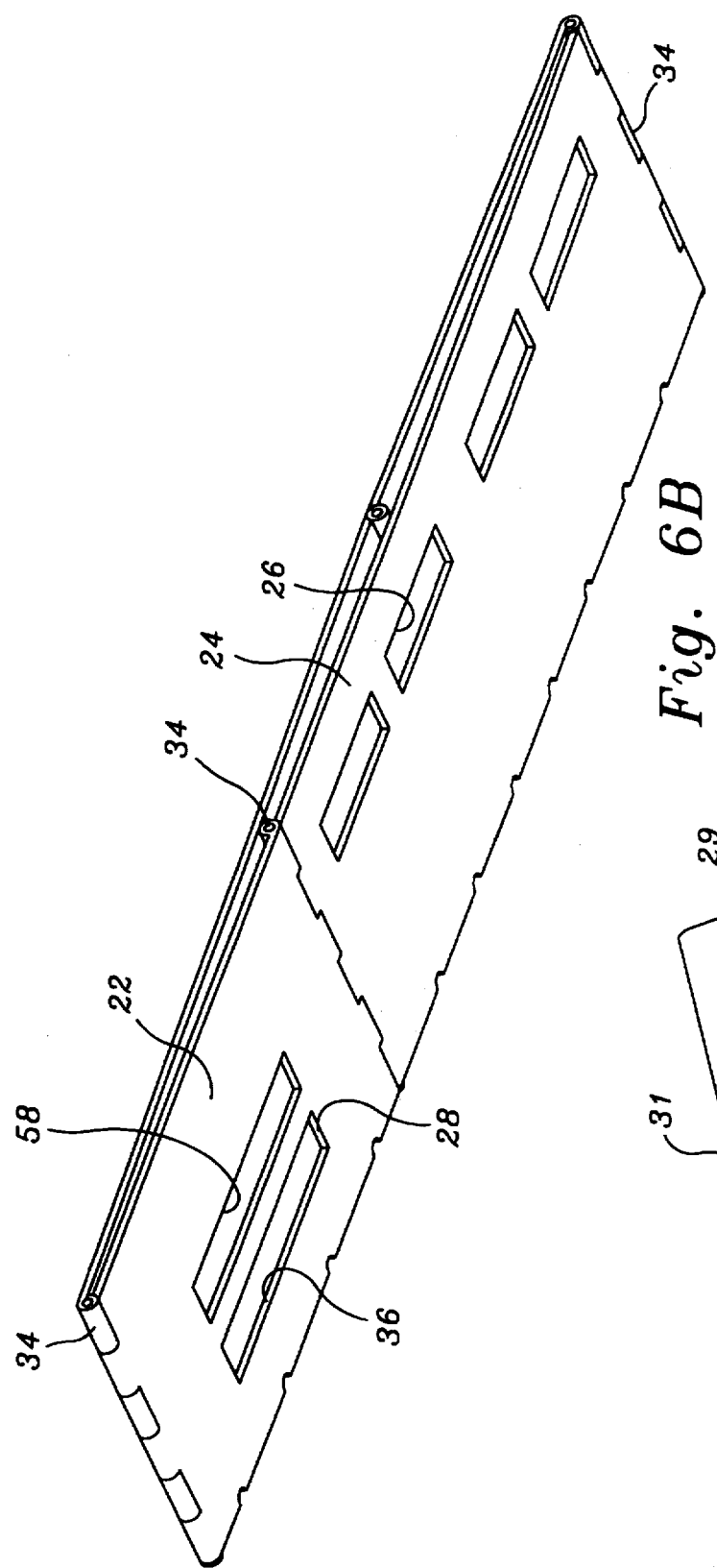
FIG. 6B is a perspective view of the second embodiment intended for use only as a collapsible stand of FIGS. 1A-5 shown in a collapsed or flatly folded configuration.

It should also be evident by the foregoing description that chafing dish assembly is light in weight, but extremely strong. There are no pop rivets, spot welds or screws or other fasteners which are prone to corrode or physically fail used in the construction of chafing dish assembly 10. There are no legs secured to a top frame strap piece as is conventional in most chafing dishes, which require fixtures or connection which may be compromised. Conventional chafing dishes do not stack, or even if foldable, cannot stack or lay flatly within a ½ inch. Further, conventional chafing dishes cannot be disassembled for easy cleaning. Prior art chafing dish assemblies typically lose their rigidity after about 15 to 20 times of usage and are relatively heavy, averaging at least 5½ pounds for the standard chafer frame, whereas collapsible stand 18 of the invention, when fabricated of aluminum plate as disclosed, weighs only a few pounds, typically less than 1–3 pounds. The ability of the invention to fold flatly is illustrated in the drawings for FIGS. 6A and B for the two preferred embodiments.

Because of the sheltered and ovenlike containment provided by collapsible stand 18 for heat sources 20, chafing dish assembly 10 of the invention requires less fuel than conventional chafers and traps the useful heat more efficiently into water pan 16.

Because of the interchangeability of the parts, if in any event any portion of collapsible stand 18 becomes damaged, the entire collapsible stand 18 need not be disposed of, but only the damaged side replaced and reassembled with its mating elements to comprise a fully restored and functional frame.

Because of the strength and simplicity of collapsible stand 18, maintenance of chafing dish assembly 10 is minimal, even when subject to repeated rough handling.

Collapsible stand 18 can be converted with a minimal number of modifications into a portable, collapsible barbecue or grill. For example, a charcoal or briquette tray 48 for carrying burning coals or fuel as shown in perspective view of FIG. 8 can be placed into the bottom of stand 18. Tray 48 is supported on top of tray 30 and has a circumferential lip 50 to contain the ashes, grease and coals within stand 18 and in tray 48. Substantially the entire bottom area defined by stand 18 when in its expanded configuration is filled by tray 48. Alternatively, tray 48 may be provided in place of tray 30 with its own end clips similar to that shown in FIG. 7.

Figure 11:
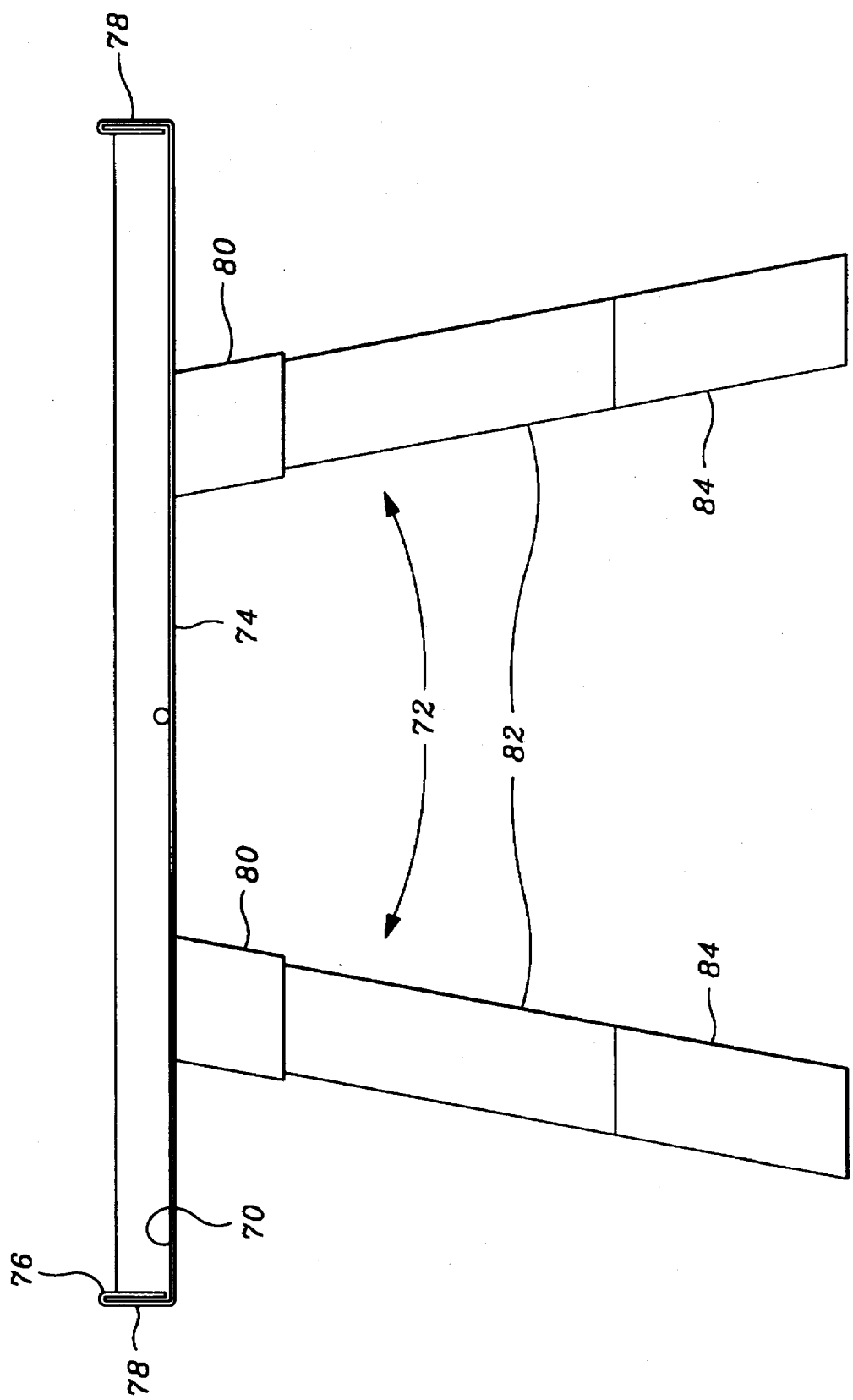
FIG. 11 is a diagrammatic end view showing a leg assembly for attached to a bottom support tray of the embodiment of the invention used as a barbecue.

The embodiment of tray 48 is shown in FIG. 8 as having a solid floor, but it may also be perforated or opened even to the form of a lattice or grill. In the case where there is the possibility for ash from the fuel and where heat exposure of surfaces below the fuel or trays 48 or 30 is a consideration, an underlying bottom tray 70 as shown in side sectional view in FIG. 11 as would be seen through a sectional line parallel to end wall 22. Only bottom tray 70 and one leg assembly 72 is depicted in FIG. 11 in the absence of the other elements of the barbecue for the sake of simplicity. Any heat would thus be shield by the interposition of solid tray 70 and any ash or embers caught and contained by the same by means of a leg assembly 72. Leg assembly 72 is comprised of two end units, one of which is shown in side elevational view of FIG. 11. A brace 74 slides the upwardly extending edges 76 of tray 70 by means of an open U-shaped flange 78 integrally formed at the opposing ends of brace 74. Cylindrical leg sockets 80 are affixed by welding or other means to the bottom surface of tray 74. Cylindrical legs 82 are then slip fit or disposed into sockets 80 to maintain the barbecue well off the supporting substrate on which it stands. Legs 82 may be secured in sockets 80 either by a slip fit or by a separate mechanical means such as a screw tightener or resilient locking clip (not shown). The lower part of legs 82 are provided with a nonslip plastic or rubber foot 84. An identical leg assembly 72 is provided on the opposing end of the barbecue thereby providing a stable four legged support.

Stand 18 is provided with a plurality of grooves or notches 50 on its upper edge 52 on both or on either ends 22 or sides 24 to receive and support the free ends 54 of one or more replaceable cooking grids or racks 56 as shown in perspective view in FIG. 9. In this manner, stand 18 now becomes a barbecue grill.

Stand 18 may further be modified by adding a plurality of vertically defined slots 58 in ends 22 into which tray 30 may be placed to provide a plurality levels for tray 48 and hence a variable charcoal-to-grill separation. Alternatively, holes 60 corresponding to notches 50 can be defined into sides 24 and/or ends 22 to allow selective vertical disposition of rack 56. The inherent flexibility of the wires from which rack 56 is fabricated allows rack 56 to be temporarily flexed to insert ends 54 into holes 60 defined into sides 24 or ends 22, after which rack 56 returns to its unflexed shape in which the width of rack 56 is greater than the corresponding wall-to-wall separation of stand 18.

Figure 10:
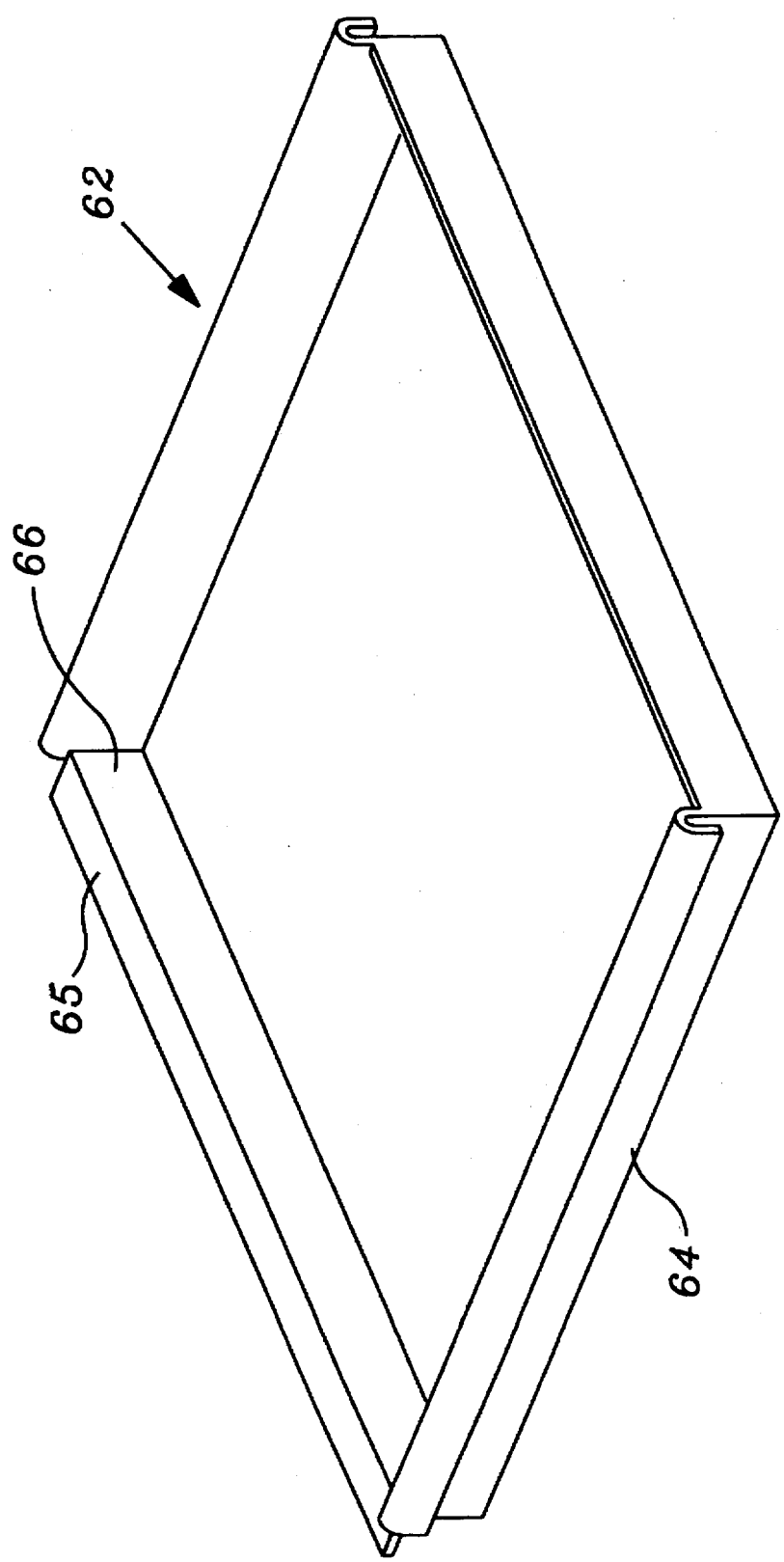
FIG. 10 is a perspective view of a skillet plate used with the tray of FIG. 8 and grill rack of FIG. 9 to convert the stand of the chafing dish assembly into a portable, collapsible barbecue or may be used in the second embodiment where the assembly is intended for use only as a barbecue.

Still further a skillet or flat cooking grill 62 as shown in FIG. 10 can be placed on top of edges 52 of stand 18 and provide a solid, flat cooking surface for cooking soft or liquid foods such as pancakes, eggs and the like. Grill 62 is fabricated of metal plate and has opposing curved lips 64 for capturing opposing edges 52 preferably of sides 24. A circumferential lip 66 is provided to retain the foods within grill 62 while being cooked. A one inch flat tab 68 extends from one side to facilitate handling of grill 62 and preferably is positioned over top edge 52 off end 22.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

For example, although the barbecue is not shown has having a cover for controlling, retaining or capturing heat, such a cover similar to cover 12 but provided with an adjustable vent hole and thermometer is contemplated as being provided.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An improvement in a barbecue assembly comprising a stand and a heat source, said improvement comprising:

a plurality of rigid sides comprising said stand open at an upper and at a lower end thereof, said sides being rotatably coupled together at their edges so as to be laterally collapsible;

means for temporarily rendering said stand rigid;

means for carrying a fuel adapted for barbecuing; and at least one grill rack, said means for carrying being supported within said stand below an upper edge thereof, said grill rack being supported within said stand above said fuel.

2. The improvement of claim 1 further comprising at least one skillet plate, said means for carrying being supported within said stand below an upper edge thereof, said skillet plate being supported within said stand above said fuel so that said barbecue assembly is converted into a portable, collapsible cookstand.

3. The improvement of claim 2 wherein said means for carrying is supported by said means for temporarily rendering said stand rigid.

4. The improvement of claim 1 wherein said means for carrying replaces and performs the function of said means for temporarily rendering said stand rigid.

5. A collapsible, portable barbecue and cookstand comprising:

a plurality of rigid sides comprising a stand open at an upper and at a lower end thereof, said sides being rotatably coupled together at their edges so as to be collapsible laterally to a substantially flat configuration;

means for temporarily rendering said stand rigid;

means for carrying a fuel adapted for barbecuing supported within said stand below an upper edge thereof;

at least one grill rack supported within said stand above said fuel; and at least one skillet plate being supported within said stand above said fuel.

6. The improvement of claim 5 wherein each of said sides are rotatably coupled together by means of a flatly folding hinge.

7. The improvement of claim 5 wherein said means for rendering said stand rigid comprises a rigid plate temporarily coupled to opposing ones of said sides and extending between them.

8. The improvement of claim 6 wherein said rigid plate is disposed between opposing sides of said stand to function as a support tray for said heat source.

9. The improvement of claim 5 wherein said sides comprise a wind-sheltered enclosure into which said heat source is placed.

10. The improvement of claim 5 wherein said sides comprise two identical and interchangeable lateral sides and two identical and interchangeable end sides.

11. The improvement of claim 5 wherein at least one of said sides is provided with at least one aperture for facilitating air access and draft for said heat source within said stand.

12. The improvement of claim 5 wherein said sides fold flatly to a thickness of no more than one-half inch.

13. The improvement of claim 11 wherein said means for rendering said stand rigid extends between said end sides of said stand and comprises a rigid tray which connects with said end sides along the length of an adjacent end of said tray.

14. The improvement of claim 12 wherein each said end sides is provided with an aperture to permit access to a heat source within said stand when a chafing dish assembly is assembled and wherein said tray is temporarily connected to said end sides along an edge of said aperture defined in each said end side.

15. An assembly convertible between a chafing dish and portable barbecue comprising:

a lid;

a food pan coverable by said lid;

a water pan into which said food pan nests;

a collapsible stand into which said water pan nests, said collapsible stand being comprised of four sides forming a rectangular structure open at an upper end and at a lower end thereof, each adjacent side being coupled together by means of a flatly folding hinge so that the structure is laterally collapsible;

means for temporarily rendering said collapsible stand rigid, means for carrying a fuel adapted for barbecuing; and at least one grill rack, said means for carrying being supported within said stand below an upper edge thereof, said grill rack being supported within said stand above said fuel, whereby a rugged, easily stored, collapsible chafing dish assembly is provided.

16. The assembly of claim 15 wherein said means for rendering said stand rigid comprises a rectangular tray temporarily attachable along ends of said tray with opposing sides of said assembly.

17. The assembly of claim 16 wherein said means for rendering said stand rigid comprises a rectangular tray temporarily attachable along ends of said tray with opposing sides of said assembly.

18. The assembly of claim 16 wherein each of said end sides are provided with a rectangular aperture, said rectangular tray having an end flange at each end of said rectangular tray arranged and configured to slip-fit over an edge of said rectangular aperture defined in each said end side.

19. The assembly of claim 15 further comprising a heat source disposable within said stand to provide heat to said water pan, and wherein said means for rendering said stand rigid comprises a rectangular tray temporarily attachable along ends of said tray with opposing sides of said chafing assembly and wherein said tray provides support for said heat source to position said heat source appropriately with respect to said water pan and to maintain said heat source in a position spaced above bottom of said stand.

20. A collapsible, portable barbecue and cookstand comprising:

a plurality of rigid sides comprising a stand, said sides being rotatably coupled together at their edges and collapsible to a substantially flat configuration;

means for carrying a fuel adapted for barbecuing supported within said stand below an upper edge thereof;

a rigid plate temporarily coupled to opposing ones of said sides and extending between them for temporarily rendering said stand rigid and for functioning as a support tray for the fuel;

at least one grill rack supported within said stand above said fuel; and at least one skillet plate being supported within said stand above said fuel.

21. A collapsible, portable barbecue and cookstand comprising:
- a plurality of rigid sides comprising a stand, said sides being rotatably coupled together at their edges and collapsible to a substantially flat configuration wherein at least one of said sides is provided with at least one aperture for facilitating air access and draft;
- means for temporarily rendering said stand rigid comprising a rigid tray extending between said sides of said stand and connecting with said sides along the length of an adjacent end of said tray;
- means for carrying a fuel adapted for barbecuing supported within said stand below an upper edge thereof;
- at least one grill rack supported within said stand above said fuel; and
- at least one skillet plate being supported within said stand above said fuel.

22. The apparatus of claim 21 wherein an end side is provided with an aperture to permit access to a heat source within said stand when a chafing dish assembly is placed thereon and wherein said tray is temporarily connected to said end side along an edge of said aperture.

23. An improvement in a barbecue assembly comprising a stand and a heat source, said improvement comprising:
- a plurality of rigid sides comprising said stand, said sides being rotatably coupled together at their edges and collapsible;
- means for temporarily rendering said stand rigid;
- means for carrying a fuel adapted for barbecuing, said means for carrying supported by said means for temporarily rendering said stand rigid; and
- at least one grill rack, said means for carrying being supported within said stand below an upper edge thereof, said grill rack being supported within said stand above said fuel forming a portable, collapsible barbecue.

* * * * *